L. HULLINGER.
Shifting-Rail for Vehicles.
No. 222,823.  Patented Dec. 23, 1879.
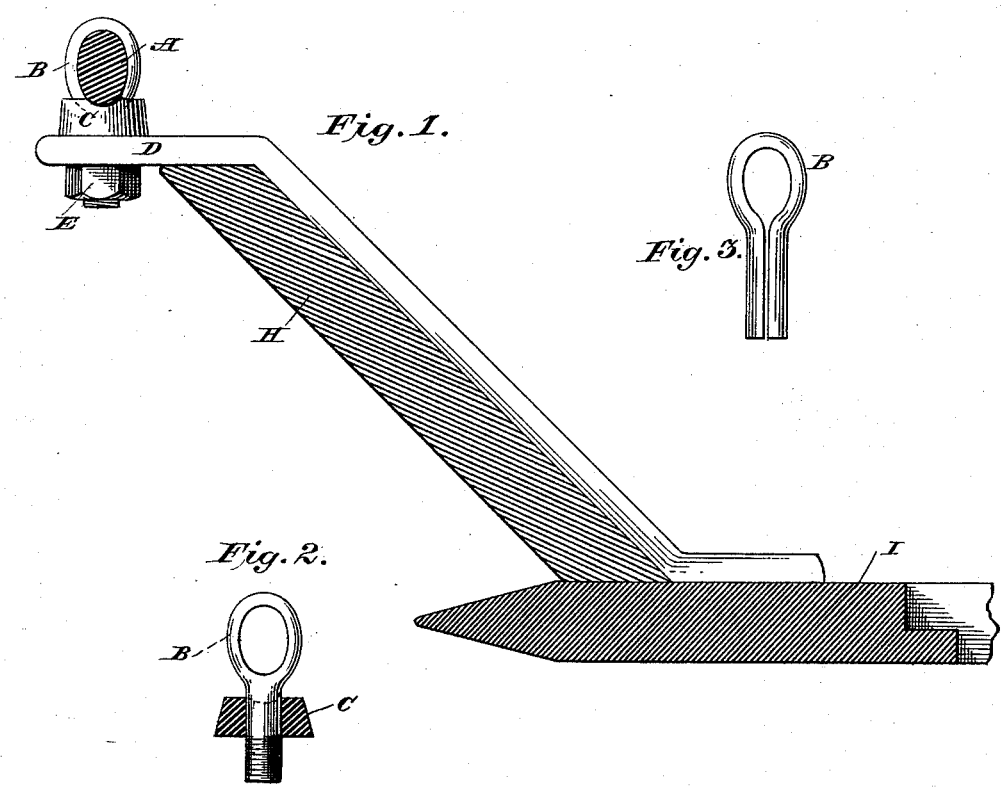

UNITED STATES PATENT OFFICE.

LEE HULLINGER, OF SPRINGFIELD, OHIO, ASSIGNOR OF ONE-HALF OF HIS RIGHT TO A. T. BYERS, OF SAME PLACE.

IMPROVEMENT IN SHIFTING-RAILS FOR VEHICLES.

Specification forming part of Letters Patent No. 222,823, dated December 23, 1879; application filed February 24, 1879.

*To all whom it may concern:*

Be it known that I, LEE HULLINGER, of Springfield, in the county of Clarke and State of Ohio, have invented a new and useful Improvement in the Construction of Shifting-Rails for Carriages, Buggies, and Wagons, of which the following is a specification.

The invention relates to the construction of shifting-rails for carriages, buggies, and wagons. Heretofore shifting-rails have been constructed by welding on of lugs or teats to the shifting-rail and filing and polishing the rail after its construction.

The object of my invention is to rapidly make a shifting-rail with rail polished without the welding on of lugs or teats to the shifting-rail.

The invention consists of an eyebolt, either solid or open, (with thread on end,) through which the shifting-rail passes, with a saddle between the shifting-rail and the seat-iron of a buggy. The tightening of the nut on end of eyebolt clamps the shifting-rail, the saddle, and seat-iron of a buggy, carriage, or wagon firmly together, and is illustrated in Figure 1 of the accompanying drawings.

Fig. 1 is a sectional view of the rear portion of a carriage-seat, in which A is the shifting-rail; B, the eyebolt; C, the saddle or washer, in which the shifting-rail rests. D is the seat-iron, perforated in the usual way for screws, bolts, or rivets; also, to receive the eyebolt B. E is the nut, the tightening of which firmly clamps the shifting-rail A, the saddle C, and the seat-iron D together. H and I are sections of the ordinary form of the rear panel and bottom panel of buggy or carriage seat with the seat-iron D in its proper place.

Fig. 2 is an elevation of the eyebolt with the saddle in section, the nut being omitted.

Fig. 3 is the eyebolt split so that the prongs pass on each side of the shifting-rail, nut and saddle omitted.

The same letters refer to like parts in each figure.

What I claim is—

A smooth shifting-rail, A, combined with an adjustable coupling-eyebolt, B, and saddle C, whereby the shifting-rail may be made without welded-on feet, and readily adapted to buggy-seats of different widths.

LEE HULLINGER.

Witnesses:
ROBT. C. RODGERS,
A. T. BYERS.